United States Patent [19]

Raschke

[11] Patent Number: 4,681,416
[45] Date of Patent: Jul. 21, 1987

[54] CAMERA SHUTTER COCKING MECHANISM

[75] Inventor: Klaus Raschke, Schaumburg, Ill.

[73] Assignee: W. Haking Enterprises Limited, Hong Kong

[21] Appl. No.: 826,971

[22] Filed: Feb. 10, 1986

[51] Int. Cl.$^4$ ............................................. G03B 17/42
[52] U.S. Cl. ................. 354/173.1; 354/204; 354/214
[58] Field of Search ............... 354/171, 173.1, 204, 354/207, 212, 213, 214, 206

[56] References Cited

U.S. PATENT DOCUMENTS

| | | | |
|---|---|---|---|
| 4,005,461 | 1/1977 | Lange | 354/204 |
| 4,383,747 | 5/1983 | Tezuka | 354/214 |
| 4,416,525 | 11/1983 | Chan | 354/173.1 |
| 4,522,477 | 1/1985 | Iwashita et al. | 354/214 |

Primary Examiner—A. A. Mathews
Attorney, Agent, or Firm—Russell E. Hattis; Stephen R. Arnold

[57] ABSTRACT

A camera shutter cocking system employs a specially configured cam driven synchronously with a film-engaging sprocket to actuate a shutter cocking lever from a released to a shutter cocking condition by means of a cam follower mounted on the cocking lever. The cam preferably has two lobes, each configured to maintain the shutter cocking load on an electric motor drive system generally constant throughout substantially the entire film advancing operation. Excessive terminal overspeed of the motor drive system is thereby suppressed. A one-way clutch between the cam and the sprocket disengages the shutter cocking system from the motor drive during rewind and traps the cocking lever in a released position, thus preventing multiple double exposure of the film if the shutter release button is accidentally held down by the user during this operation.

12 Claims, 19 Drawing Figures

FIG_1A
PRIOR ART

FIG_1B
PRIOR ART

FIG_3A_
PRIOR ART

FIG_3B_
PRIOR ART

CAMERA SHUTTER COCKING MECHANISM

DESCRIPTION

TECHNICAL FIELD

The technical field of the invention is electrically driven cameras, and in particular electrically driven shutter cocking systems for such cameras.

BACKGROUND OF THE INVENTION

One problem encountered in cameras, and in particular in the case of cameras having electrically driven advance and rewind systems, is that of decoupling the shutter system during rewind so that accidental depression of the shutter button does not cause repeated tripping of the shutter, resulting in double exposure of the film. This problem can be particularly acute in high speed electric rewind systems, where a few seconds' inattention on the part of the operator can cause loss of film footage. The origin of this problem lies in the fact that the shutter cocking system is generally directly actuated by rotation of a film engaging sprocket used to govern the length of each one-frame film advance. Since the sprocket must of necessity rotate during rewind as well as during advance, a great many camera designs suffer from the limitation that rotation of the sprocket in the rewind direction will cock the shutter mechanism as readily as it does when driven in the film advancing direction. Such bidirectonal shutter cocking gives rise to the abovementioned problem of accidental multiple film exposure during rewind if the shutter button is held depressed during rewind. A simple and inexpensive solution to this problem would clearly be a useful feature for such cameras.

Another problem frequently encountered in electrically driven cameras arises from the fact that during film advance the shutter cocking system places an unduly varying time-changing load on the motor drive system, which causes an undesired noisy camera operation and undesired heavy peak load on the drive mechanism of the camera. This arises principally because of the fact that during shutter cocking, a sprocket driven cocking lever or member is driven from a relaxed to a shutter cocking position against the force of an energizing spring associated therewith. Since the restoring force of the spring increases with its extension, the motor load will normally rise during that fraction of the film advance operation in which the cocking lever is moved between these two positions. A consequence of this time-varying load on the motor system is that the motor and its associated gearing must be chosen so as to overcome the peak torque reflected through the gear train by the cocking load, and yet provide sufficient average drive speed to advance one frame in a reasonable time, e.g., one-quarter to one-half second. The result is that after the cocking lever has been cocked and its load thereafter removed from the motor drive system, the drive system rapidly speeds up, since the cocking load is typically the major load thereon. This final film advancing speed is much higher than the average speed necessary to advance the film and causes a noisy high speed gear whine. Suppression of such noise by appropriate modification of the film advancing and shutter cocking system is also a needed improvement in motor driven cameras.

Moreover, at the end of film advance, the motor drive system is normally brought to a sudden stop by throwing a short circuit across the motor winding, thereby dissipating the angular kinetic energy of all rotating systems, in particular that of the motor armature. Since kinetic energy varies as the square of the angular velocity of the armature, and since the total frame advance time is governed solely by the average value of the angular velocity, it follows that such overspeed terminal drive rate represents wasted battery energy. It would thus be a desirable feature to eliminate terminal overspeed for energy reasons as well.

SUMMARY OF THE INVENTION

Both of the problems mentioned in the Background of the Invention are solved by modifying the nature of the mechanical engagement between the shutter cocking lever (cocking member) and the rotating film-engaging sprocket which moves it from a released to a shutter cocking position. According to a feature of the invention, a unique cam drive system is provided to couple the rotation of a film-engaging sprocket moving in synchronism with the film to actuate the cocking lever from a released to a cocking position. A cam having at least one and preferably two lobes, and preferably mounted directly on the sprocket to be rotated therewith, engages a cam follower provided on the cocking lever to actuate it through a cocking cycle. Each cam lobe is configured with an outwardly spiraling profile specially configured to reflect a more or less constant load on the motor drive system as the cocking lever moves against the constantly increasing force of its associated energizing spring. The outwardly spiraling cam profile engages the cam follower throughout substantially the entire one-frame film advance, thereby holding the motor drive speed substantially constant. According to a specific feature of the invention, the radius of the outwardly spiraling cam profile varies approximately as the square root of the angular rotation of the cam; however, empirical corrections to the profile may also be carried out where necessary.

According to an independent but related feature of the invention, accidental multiple exposure of the film during rewind is prevented by providing a disengaging clutch, prefereably of the one-way type, to disconnect the cam from the motor drive system so that multiple recocking of the shutter system cannot occur, thereby preventing the previously mentioned loss of film footage if the shutter release button is accidentally held in a depressed condition. According to a specific feature of the invention, to prevent frictional drag forces in the clutch from transmitting a cocking torque to the cam during rewind, such recocking is prevented by configuring the retrace portion of each cam lobe, i.e.,. that terminal portion of the outward spiral where the cam contour again returns to minimum radius, as a radical inwardly running step forming a trap which captively holds the cam follower at the minimum-stroke position thereof. The immediate consequence of this is that the cocking lever is trapped in the released position during film rewind so that multiple shutter cocking is prevented.

Thus, the two independent features of the invention bear a complementary relationship. By configuring the retrace region as a radical inwardly running step one achieves the trapping engagement between the cam follower and the cam, while at the same time the entire remainder of the cam lobe profile may be suitably tailored so as to preserve constant load on the motor drive system throughout substantially the entire film-advancing operation.

The features of the present invention are applicable to both types of commonly employed impulse-driven shutter systems, i.e., those in which the cocking lever is released from a latched position to strike an extension on a spring-loaded flip-open shutter directly, or alternatively to those systems wherein a spring-loaded shutter slide is held in a latched position to strike the shutter upon release, and wherein the cocking lever is used to return the slide from a released to a cocked position.

Thus, with a minimum of components, either kind of conventional impulse-driven shutter system can be configured so as to provide substantially constant load on the motor drive system throughout film advance, and to effectively prevent against accidental multiple exposure on film rewind.

Other advantages and aspects of the invention will become apparent upon making reference to the specification, claims, and drawings to follow.

DETAILED DESCRIPTION

FIGS. 1A-3B inclusive show the principal elements of a shutter release and shutter cocking system as described in U.S. Pat. No. 4,416,525 issued Nov. 22, 1983. The teachings of this patent are incorporated herein by reference. The teachings of the present invention will be applied to the representative shutter actuation and recocking system shown in FIGS. 1A-3B, as well as to an alternative form of shutter cocking and actuation system shown in FIGS. 9A-12.

Figure 1A:
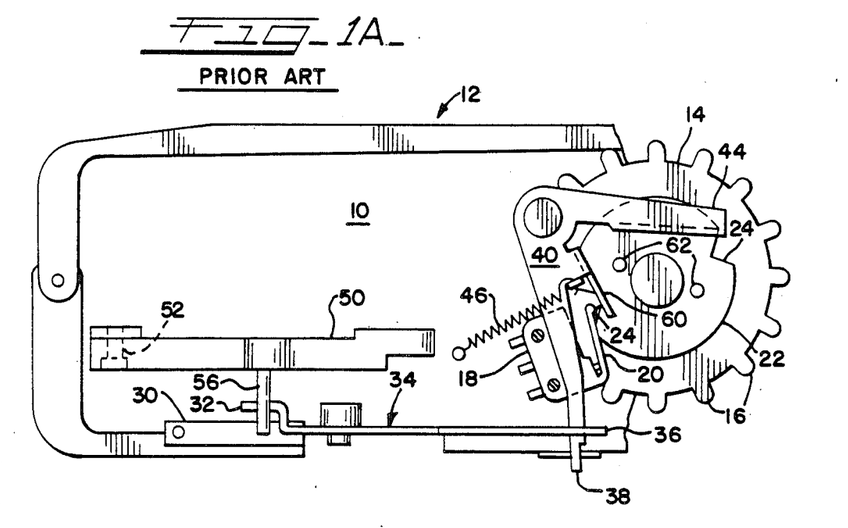
FIG. 1A is a plan view of the principal elements of a prior art shutter cocking and release system employing a releasable cocking lever used to energizingly strike an impulsively driven shutter, showing the system in a cocked condition.

FIGS. 1A-3B show the principal elements of an impulse-type shutter cocking and actuation system disposed on a shutter system baseplate 10 of a camera 12. A sprocket 14 provided with film-engaging teeth 16—16 is disposed to engage the perforations of a movable film strip (not shown). During film advance, the principal function of the sprocket 14 is to be driven by the film strip to provide positional information used to terminate film movement at the end of a one-frame advance, and to return the shutter release system to a cocked condition as well. FIGS. 1A and 1B show the elements of the system with the shutter release system in a cocked position. In electrically driven cameras, the system is maintained in a dormant condition by a film metering switch 18 provided with a switch lever 20 actuated by a metering cam face 22 integral with the sprocket 14 and having a pair of metering detents 24—24 thereon into which the switch lever 20 drops at the end of each one-frame advance to terminate the film advancing process. The details of such systems are well-known in the art, and are set forth in particular detail in the above-referenced U.S. patent.

Figure 1B:
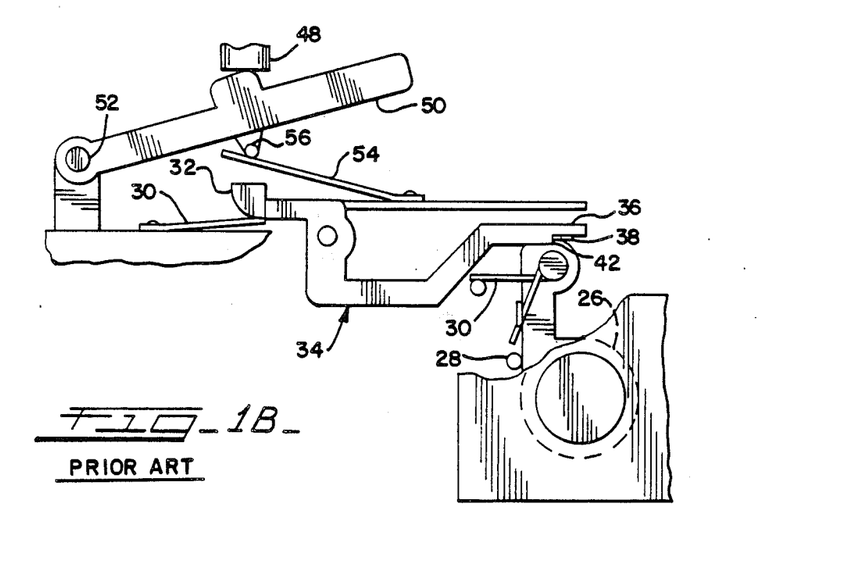
FIG. 1B is front elevation of the principal elements of FIG. 1A showing further details of the shutter actuation system.

With the system in a cocked state as shown, a pivotally mounted shutter blade 26 is held in the closed position against a stop 28 by a spring 3. A leaf spring 30 presses one end 32 of a pivotally mounted shutter release bar 34 so as to press the other end 36 of the shutter release bar into trapping engagement with one end 38 of a cocking lever (cocking member) 40 against a cocking step 42 in the shutter release bar. An outboard arm 44 of the cocking lever 40 is spring-urged by a spring 46 to press the cocking lever end 38 into secure engagement with the cocking step 42. An exposure is initiated by pressing down on an exposure button 48 to engage a shutter release member 50 rotatably mounted on a pivot 52 and normally urged upward by a leaf spring 54, thus pressing the release member downward. Such depression of the release member 50 causes an integral pin 56 on the release member 50 to engage the lefthand end 32 of the shutter release bar 34, thereby rotating the cocking step 42 upward and out of engagement with the cocking lever end 38, thereby releasing the cocking lever for clockwise rotation as seen in FIG. 1A.

Figure 2A:
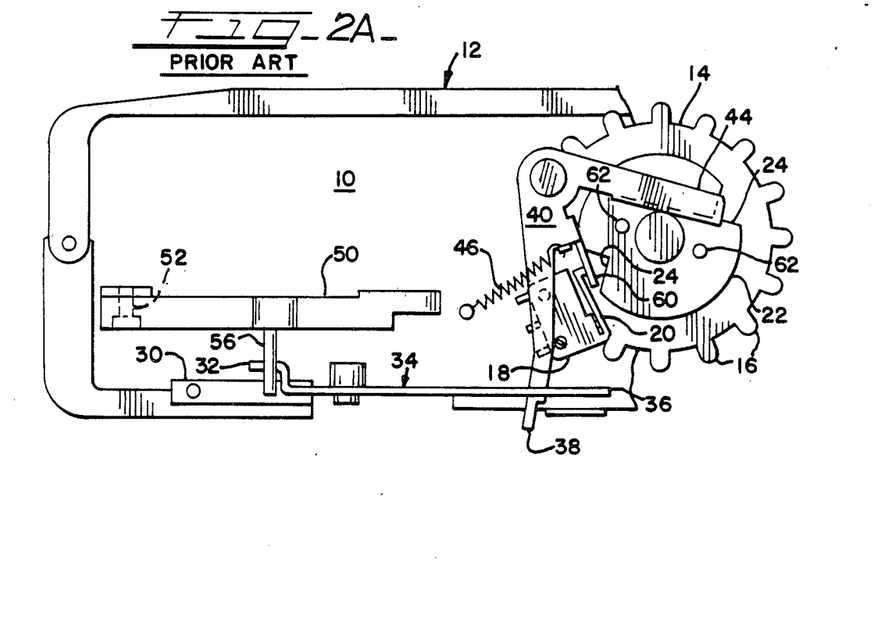
FIG. 2A shows the shutter release system of FIG. 1A immediately after release of the cocking lever from its latched condition.
Figure 2B:
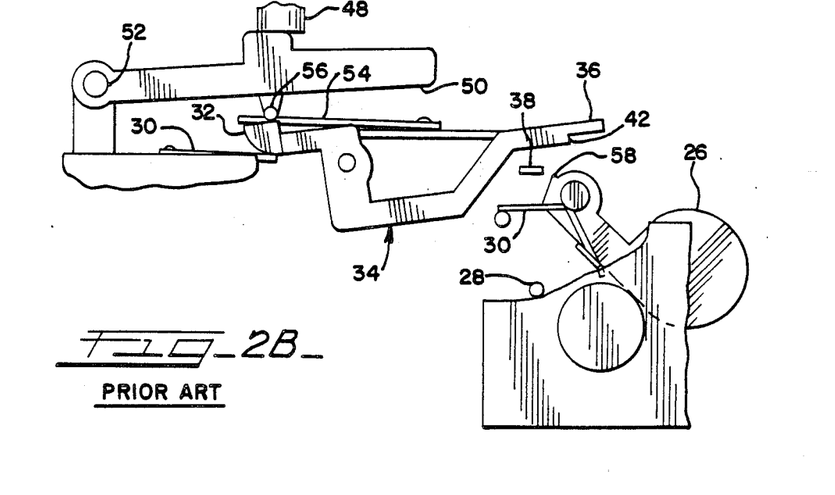
FIG. 2B is similar to FIG. 1B, but shows the impulsive actuation of the shutter to an open condition.

FIGS. 2A and 2B show the configuration of the camera just after the cocking lever 40 has been released. The cocking lever 40 rotates clockwise at a very high speed, and its end 38 hits an engaging step 58 on the shutter blade 26, causing the latter to flip open. At the same time, an extension edge 60 of the cocking lever 40 acts on the lever arm 24 of the switch 18, thus actuating the latter to the 'ON' state. A suitable delay system (not shown) is provided to insure that film advance does not begin until the shutter exposure cycle has been completed. The cocking lever 40 is stopped in its released position by the engagement of the lever edge 60 with the lever arm 20 of the switch 18. Shortly after shutter release, the shutter blade 26 is forced to return to its closed position in touch with the stopper 28 by the shutter return spring 30. After the film exposure is complete, a one-frame advance of the film is initiated by electrical means.

Figure 3A:
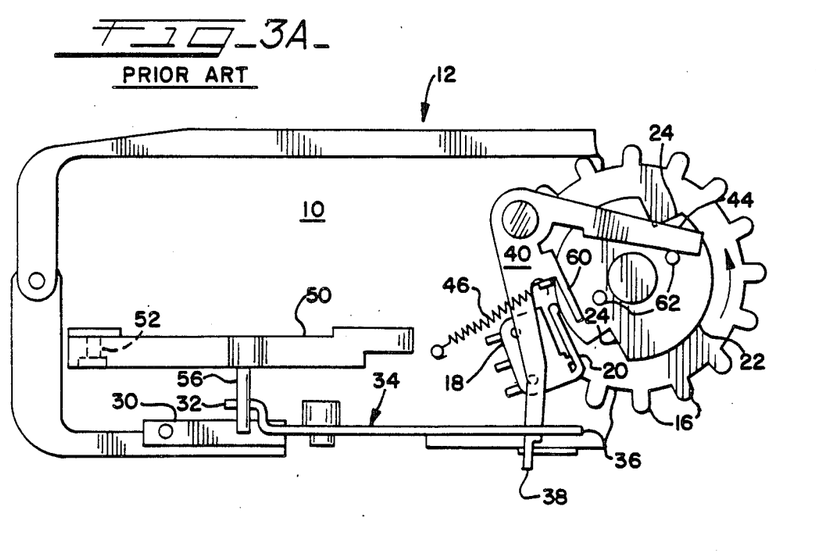
FIG. 3A shows the system of FIGS. 1A and 2A during an intermediate phase of the recocking of the cocking lever.
Figure 3B:
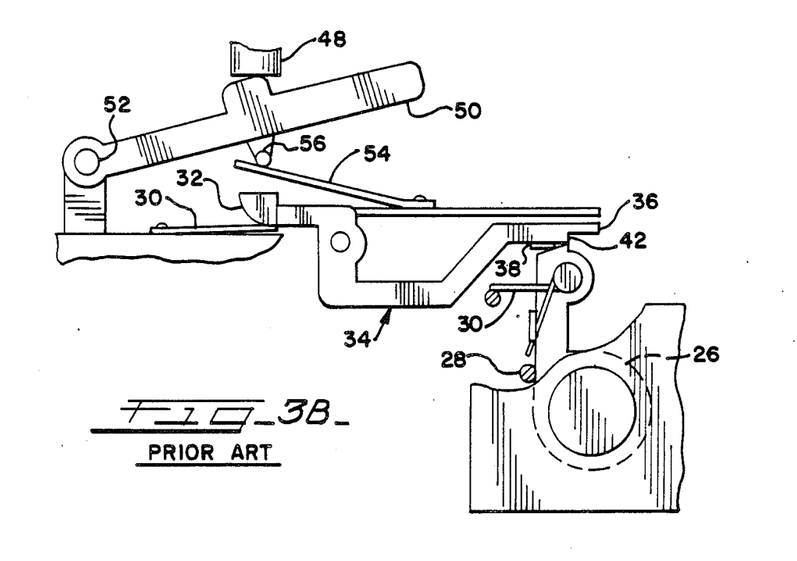
FIG. 3B shows the principal elements of the shutter system during the recocking operation shown in FIG. 3A.

FIGS. 3A and 3B show the system during film advance. As the film travels to the left, the sprocket 14 is caused to rotate in a counterclockwise direction by engagement between the teeth 16—16 and the film perforations. An initial phase of this rotation brings one of two eccentric pins 62—62 extending upward from the sprocket into engagement with the outer arm 44 of the cocking lever 40 to initiate the cocking process. The onset of this condition is shown in FIGS. 3A and 3B. It will be noted that the surface of the metering cam 22 now holds the switch 18 in a closed motor-energizing position throughout film advance. Rotation continues with the pin 62 finally urging the cocking lever 40 into the cocked position shown in which the end 38 of the cocking lever has been returned to engage the cocking step 42 of the shutter release bar 34. Rotation continues until the configuration shown in FIG. 1A is once again achieved, whereupon the arm 24 of the switch 18 actuated by its own internal tension, springs outward into a detent 24 of the metering cam 22 to open the switch. Power is thereby removed from the motor drive system, and the advance of film immediately stops automatically. The shutter release system is now cocked and ready for the next exposure.

As set forth in greater detail in the Background of the Invention, such a system has two principal disadvantages. One arises quite commonly in motor-driven cameras, particularly those of the autorewind type which go into automatic rewind when an end-of-film condition is sensed. If the shutter button is accidentally depressed at any time after the rewind sequence is initiated, the shutter system will be operated to a released condition, with the result that the eccentric pins 62—62 will repeatedly move the cocking lever 40 through a series of cycles wherein it will repeatedly strike the end 58 of the shutter blade 26. At low rewind speeds, this impulse may not be enough to drive the shutter blade 26 to a fully open position; however, it is frequently experienced that multiple spurious weak exposures will be present on the film as a result. The higher the rewind speed of the camera, the stronger will be these impulses, and the stronger these ghost images will be.

The second problem arises from the fact that the load presented by the cocking system during movement of the cocking lever 40 from the released to the cocked positions thereof typically occurs as a short peak load on the motor. As pointed out in the Background of Invention, substantial advantages are to be secured by spreading the cocking load substantially uniformly over the entire one-frame film advance operation.

Figure 4A:
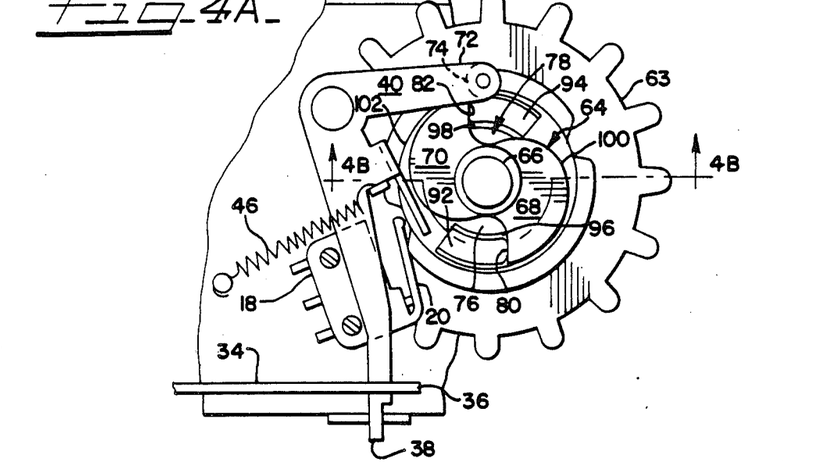
FIG. 4A shows the shutter cocking system of FIG. 1A reconfigured with a specially configured recocking cam and a one-way clutch, the system being in the cocked state.
Figure 4B:
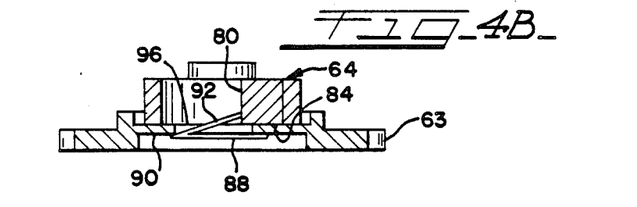
FIG. 4B is a partial cross-section view of the cam and one-way clutch elements of FIG. 4A, further showing a one-way clutch spring.

The present invention solves both of these problems in a novel way, as will next be discussed with reference to FIGS. 4A–8B. With particular reference to FIG. 4A, showing the modified system in a cocked condition generally similar to that previously discussed with respect to FIG. 1A, it will be noted that the eccentric pins 62—62 have been replaced by a cam (camming means) 64 rotatably mounted on the sprocket shaft 66 and free to move therearound with respect to the sprocket 63. The cam consists of two cam lobes 68,70 spiraling gradually outward to their maximum extension, the camming surfaces then retracing radically towards the sprocket shaft 66. The outer cocking lever arm 44 of FIG. 1A has been modified to a new form 72, and now carries a rotating cam follower 74 at the driven end thereof. In the cocked position shown, it will be noted that the cam follower 74 and the cam lobes 68,70 are positioned so that the cam follower is held at its maximum extension by the latching of the cocking lever end 38 by the shutter release bar (see FIG. 1B), and further confronts one of two cam wells 76,78 formed by the radical retrace of the cam surface at the terminal portions 80,82 of the cam lobes and at the initial shoulder regions of the other cam lobe. The cam 64 has a generally planar lower face 84 thereon slidably confronting the upper generally planar face 86 of the sprocket 63. With particular reference to FIG. 4B, a generally disk-shaped clutch spring 88 is secured (by means not shown) to the lower face 90 of the sprocket 63. A pair of resilient pre-stressed spring fingers 92,94 extend upward through arcuate cutouts 96,98 in the sprocket to confront the retrace portions 80,82 of the two cam lobes 68,70 respectively. When the sprocket 63 is driven counterclockwise during film advance, the fingers 92,94 engage these retrace surfaces 80,82 to rotate the cam 64 in synchronism with the sprocket.

Figure 5:
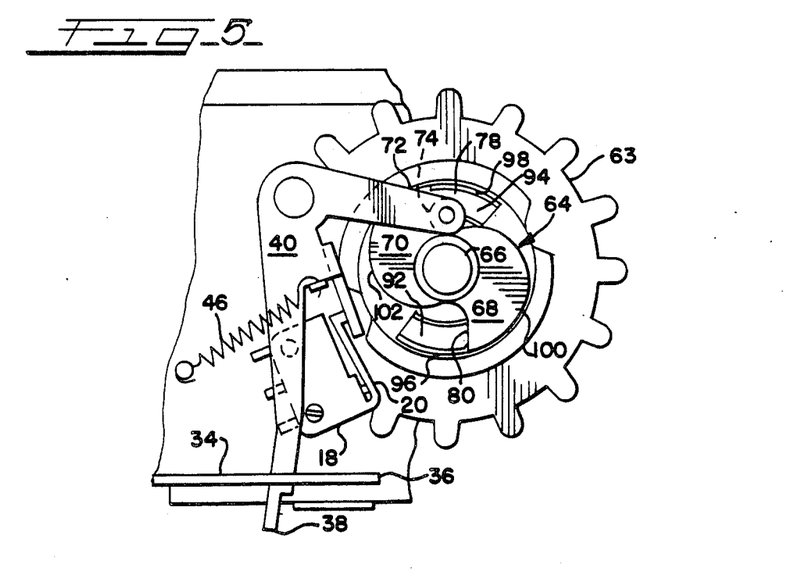
FIG. 5 shows the elements of the system shown in FIG. 4A after release of the cocking lever to actuate the shutter.
Figures 6, 7, 8A, 8B:
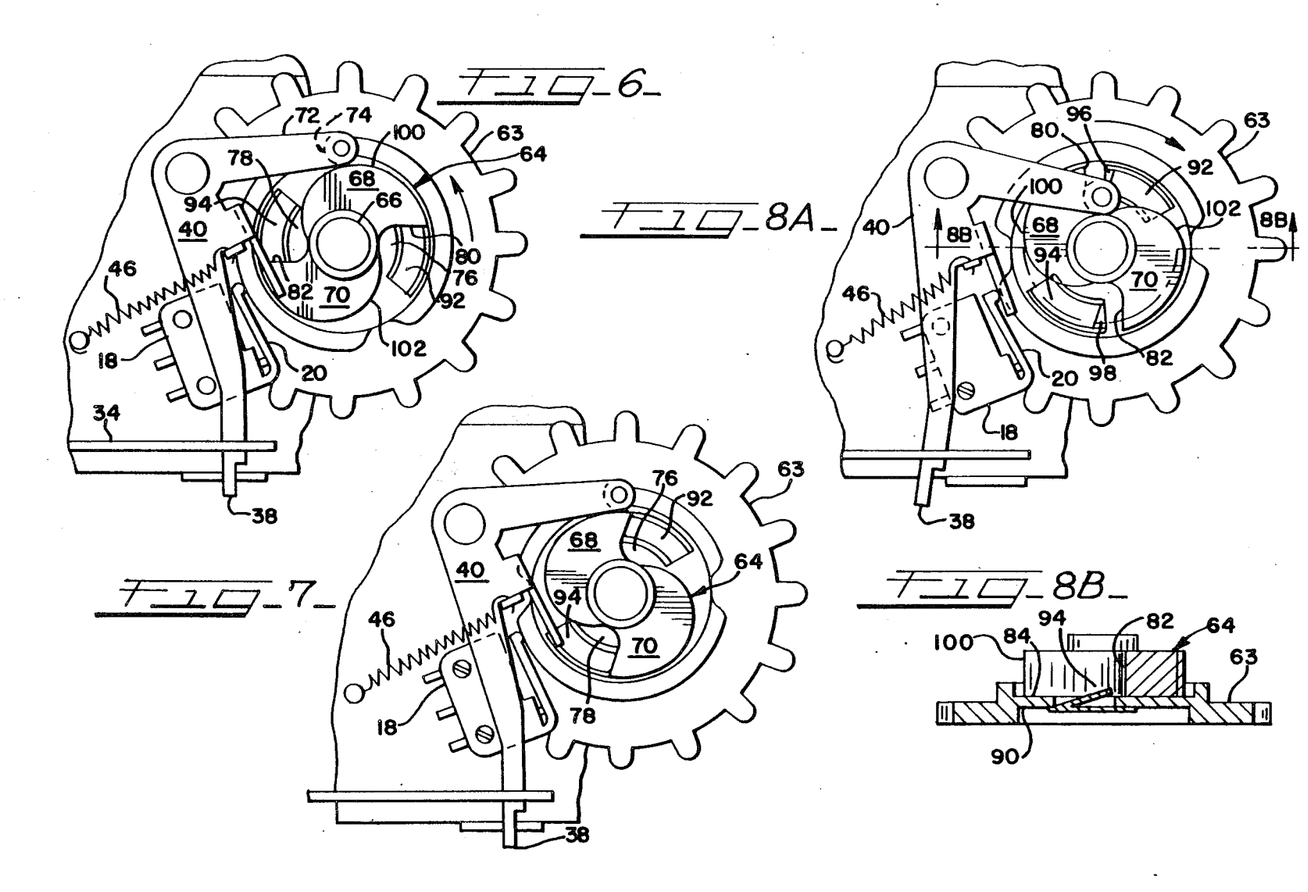
FIG. 6 shows the elements of the shutter release system shown in FIG. 4A during an intermediate phase of film advance wherein the cocking lever is beginning its retrace movement to the cocked state shown in FIG. 4A.
FIG. 7 shows the system of FIG. 4A with the cocking lever nearly fully returned to the cocking position indicated in FIG. 4A.
FIG. 8A shows the shutter cocking system of FIGS. 4A-7 during rewind, showing capture of the cocking lever.
FIG. 8B is a partial cross-section view of the clutch shown in FIG. 4B showing disengagement of the one-way clutch during rewind.

FIG. 5 shows the modified shutter release system in a state corresponding that of FIG. 2A, i.e., the relaxed state of the cocking lever 40 after tripping the shutter release bar 34. It will be noted that the cocking lever 40 has rotated to the relaxed position, with the result that the cam follower 74 now lies in the trapping region 78 between the two cam lobes 68,70. FIGS. 6 and 7 show initial and almost terminal phases of the film advancing operation wherein the cam follower 74 gradually is raised by the cam lobe 68 to return the cocking lever 40 ultimately to the cocked position shown in FIG. 4A.

With respect to the previously mentioned problem of holding a uniform motor load during film advance, the spiral contours 100,102 of the cam lobes 68,70 are configured to provide during each film advancing operation an initial small range reflecting negligible loading of the spring 46 onto the cam 64 so as to allow initial wind-up of the film advancing motor to proper speed, followed a gently spiraling contour specifically tailored to reflect a constant load on the motor throughout essentially the entire film advance operation. From a purely theoretical standpoint, to a first approximation this implies that the cam radius must vary generally as the square-root of the angular displacement of the cam 64. This follows from the conditions laid down, i.e., the requirement of a constant rate of work done per unit time against a linear restoring force provided by the spring, and from the requirement that the sprocket rotate at a constant angular velocity. In practice, for any given camera system, additional empirical refinements to the contours 100,102 of the cam lobes 68,70 are best carried out by monitoring the motor current during film advance and appropriately flattening the cam lobe contours to eliminate any residual abnormal peak current demand.

FIGS. 8A and 8B show the initial phases of the disengagement of the spring clutch fingers 92,94 from the retrace faces 80,82 of the cam lobes 68,70 during an initial portion of rewind. It will be noted that with the sprocket 63 rotated slightly clockwise during film advance and the cocking lever follower 74 trapped in one of the cam well (trapping) regions 78, the clutch fingers 92,94, driven in a retreating direction with respect to the cam retrace faces 80,82 by the sprocket rotation, move away therefrom. FIG. 8B shows the cam 64 and sprocket 63 in the condition shown in FIG. 8A, showing how the lower edge of the outwardly spiraling faces 100,102 of the cam lobes slide over the clutch fingers 92,94 during the rewind operation.

It will be noted from the foregoing that the cocking lever 40 must be maintained in a non-cocking position during rewind, thus removing any possibility of accidental multiple actuation of the shutter mechanism during the rewinding process. In the event that rewind is initiated in the cocked state shown in FIG. 4A, then accidental depression of the shutter button 48 during rewind will cause at most one false tripping of the shutter mechanism. In the event that rewind is initiated at any other portion of the film advance other than the extreme terminal portion where the shutter system is cocked, any clockwise rotation of the cam 64 will cause the cam follower 74 to follow the spiraling profile of the cam until it is trapped. If the one-way clutch were ideal, i.e., frictionless, then the force of the shutter arm energizing spring 46 would cause the cam to rotate clockwise to cause the cocking lever 40 to revert to the fully released position. In practice, however, and most importantly if a friction clutch is used instead of a one-way clutch, the cam 64 is configured with retrace regions 80,82 configured sufficiently radically to trap the cam follower 74 and prevent it from climbing a retrace region and cocking the shutter system.

FIGS. 9A–12 show the principles of the present invention as applied to another generally-known type of shutter release system wherein the cocking lever 40 does not supply the impulse to the shutter blade directly, but instead drives a spring-actuated shutter slide to a cocked position, the slide in turn being actuated to a released position to strike the shutter blade (not shown in the views). In more detail, and with particular reference to FIGS. 9A and 9B, the shutter system shown therein employs a similar cam 64 and cocking lever 40 as before, but the cocking lever is provided at one end thereof with a slide actuating extension 104 disposed to generally confront a cocking extension 106 provided on a portion of a shutter slide 108. The shutter slide 108 is slidably mounted on guide pins 110 (one not shown) and urged to the left by a slide energizing spring 112. Here the shutter release bar 34, urged clockwise by an energizing spring 114, is provided with a slide-engaging cutout 116 configured to engagingly confront a portion 118 of the cocking extension 106 to hold the shutter slide 108 in a cocked position to the right against the force of the slide energizing spring 112 as shown. Here the cam 64 is positioned so that in the cocked state of the system the cam follower is in the trapped position.

Figure 9A:
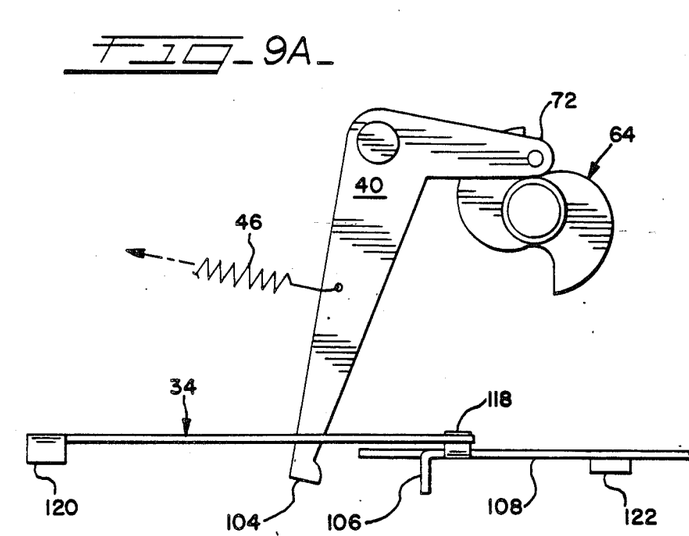
FIG. 9A is a plan view of the principal elements of an alternative adaptation of the cam and one-way clutch system to a shutter release system wherein the cocking lever retracts a shutter slide to be captively secured by a shutter release bar, the system being shown in the cocked position.
Figure 9B:
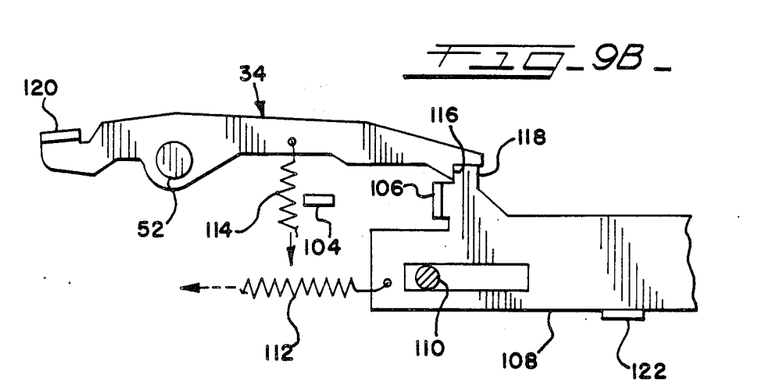
FIG. 9B is a front elevation of the principal elements of the shutter release system shown in FIG. 9A.

A substantial distance is now provided between the slide actuating extension 104 of the cocking lever 40 and the cocking extension 106 of the shutter slide 108. A downward pressure applied to a shutter button pad 120 on the lefthand end of the release bar 34 causes counterclockwise rotation of the release bar about its associated pivot 52 to release the shutter slide 108 to travel to the left to actuate the shutter (not shown in the Figures) by means of a striker extension 122 integral therewith.

Figure 10A:
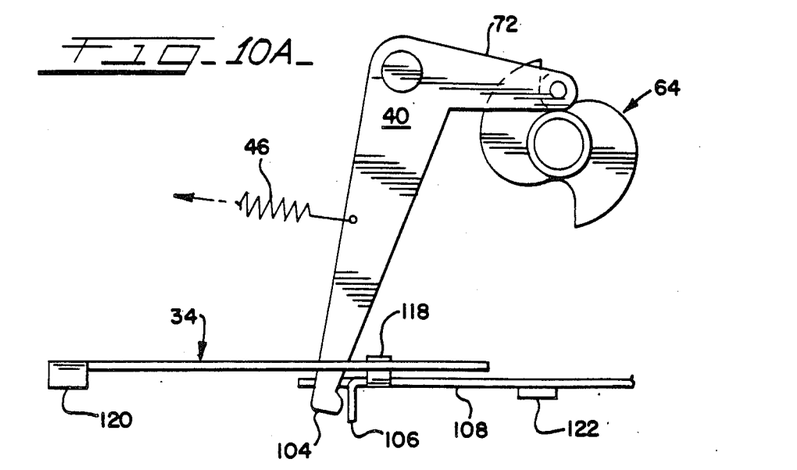
FIG. 10A is a plan view of the elements of FIG. 9A during initiation of a film advance cycle after the shutter has been tripped.
Figure 10B:
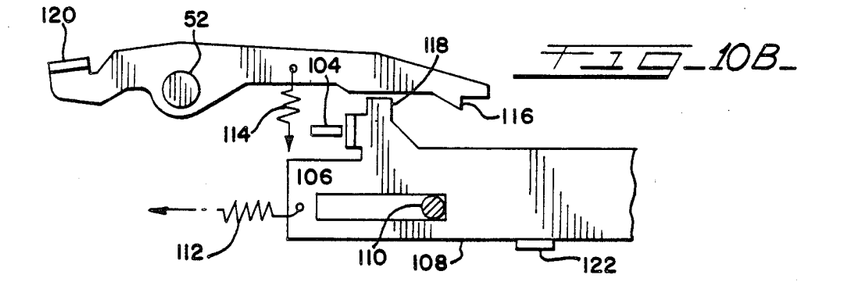
FIG. 10B is a front elevation of the principal components of FIG. 10A at this same time.
Figure 11:
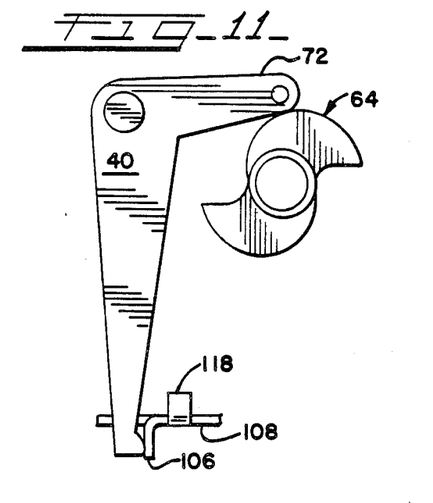
FIG. 11 is a plan view of the principal elements of FIGS. 9A and 10A during an initial phase of the rewind operation.
Figure 12:
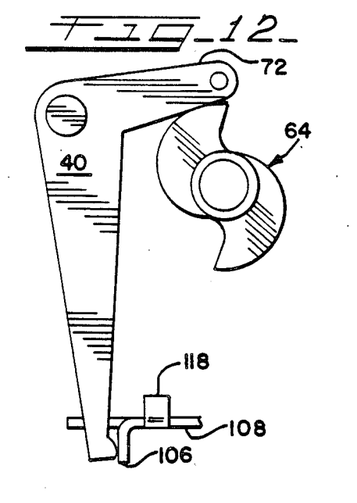
FIG. 12 is a plan view similar to FIG. 11, showing the principal elements of the system shortly prior to termination of the film advance and shutter cocking operation.

FIGS. 10A and 10B show the shutter slide 108 in the released state, further showing that a small space exists between the slide actuating extension 104 and the shutter slide cocking extension 106. FIGS. 11 and 12 show intermediate and nearly terminal phases of the recocking operation wherein the rotation of the cam 64 causes the slide actuating extension 104 to engage the cocking extension 106 of the shutter slide 108 to drive it to the right to the nearly cocked state shown in FIG. 12, and ultimately to return it to the cocked state shown in FIG. 9A, wherein the cam follower 74 has again snapped into one of the trapping regions 76,78 of the cam. Here again, by appropriately shaping the contours of the cam lobes 68,70, uniform power loading is reflected to the drive motor. As in the previous system, upon rewind, the cam follower 74 will be trapped by the cam 64 to prevent accidental multiple exposure.

Thus, in either system, by properly shaping the cam contours to present a proper variation of radius during film advance, followed by a trapping contour, and by the use of a one-way clutch, accidental multiple exposure of the entire filmstrip during rewind is effectively eliminated, and motor load is held constant throughout substantially the entire film advancing process. The teachings of the present invention are clearly applicable to a great variety of existing systems at minimum expense.

The non-constant load for which the specially configured cam lobes are provided has been described solely in terms of cocking lever loading. It will be evident, however, that these principles are directly applicable to a variety of other variable load systems actuated during film advance. Thus, while the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In a camera having a shutter release system, an electric motor drive system coupled to advance a film and actuate a shutter-cocking system from a released to a cocked condition with each one-frame advance of said film, said shutter-cocking system restoring said shutter release system to a cocked condition responsively to movement of a movable cocking member coupled to be driven by said motor drive system from a released to a shutter-cocking position against the opposing force of at least one energizing spring, said opposing force increasing with the movement of said cocking member from said released to said shutter-cocking position, the improvement comprising:

camming means rotatingly driven by said motor drive system and having at least one cam lobe with a contour of varying radius from the axis of rotation thereof;

cam follower means coupled to said cocking member and urged to engagingly follow said cam lobe so as to move said cocking member from said released to said shutter-cocking position against said increasing opposing force, said lobe contour being configured to maintain the load of said shutter cocking system on said motor drive system generally constant throughout film advance.

2. The camera of claim 1 wherein the radius of the principal portion of said lobe profile increases generally as the square root of the angle of rotation of said cam lobe.

3. The camera of claim 1 wherein a terminal portion of said lobe profile is configured with an inward retrace contour proceeding rapidly towards the rotational axis of said cam lobe, said motor drive means terminating a one-frame film advancing operation with said camming means oriented to place the contour of said cam lobe immediately following said retrace region facing said cam follower means.

4. The camera of claim 1 wherein said camera includes film-engaging sprocket means rotatingly driven by film movement during film advance and said camming means is coupled to said sprocket means to be rotatingly driven thereby.

5. The camera of claim 4 wherein said camming means includes a two-lobed cam providing two cocking operations for each rotation of said sprocket means.

6. In a camera having shutter release means, a film advance and rewind drive means coupled to advance and rewind film and to actuate shutter-cocking means from a released to a cocked condition with each one-frame advance of said film, said shutter-cocking means restoring said shutter release means to a cocked condition responsively to movement of a movable cocking member coupled to said drive means to be driven from a released to a shutter-cocked position and including camming means coupled to said drive system to be rotatingly driven synchronously with film movement during film advance; and cam follower means coupled to said cocking member and urged to engagingly follow said camming means so as to move said cocking lever from said released to said shutter-cocking position during movement of said camming means, the improvement comprising:

decoupling clutch means for decoupling said camming means from said drive means during rewind and latching means for lockingly immobilizing said camming means during rewind by lockingly engaging said camming means to said cam follower means so as to maintain said cocking member in said released position.

7. The camera of claim 6 wherein said camming means is provided with at least one cam lobe having a contour of varying radius from the axis of rotation of said cam lobe, said contour having terminal rapid inward retrace region configured to trappingly prevent cyclic actuation of said cam follower means if said camming means is rotated in a direction opposite to which said camming means rotates during film advance.

8. The camera of claim 7 wherein said camera includes cocking member spring bias means coupled to said cocking member for urging said cam follower means to engagingly follow said camming means.

9. The camera of claim 6 wherein said camera includes film-engaging sprocket means rotatingly driven by film movement during film advance and said camming means is coupled through said clutch means to said sprocket means to be rotatingly driven thereby during film advance.

10. The camera of claim 9 wherein said clutch means includes a one-way rotational clutch configured to couple said camming means to be driven from said drive means when said drive means is operated in a film-advancing direction and to decouple said camming means from said drive means when said drive means is operated in a film-rewinding direction.

11. The camera of claim 9 wherein said drive means includes electric motor means, said camera further including at least one energizing spring against the force of which said cocking member restores said shutter release means to a cocked condition, the force exerted by said energizing spring increasing with the movement of said cocking member from said released to said shutter-cocking position attendant to a film-advancing operation, said camming means including at least one cam lobe having a contour of varying radius from the axis of rotation thereof, said cam lobe contour being configured so as to maintain the load of said shutter cocking means on said drive means generally constant throughout film advance.

12. In a camera having shutter release means, film-engaging sprocket means rotatingly driven by film movement during film advance, a film advance and rewind drive means coupled to advance and rewind film and to actuate shutter-cocking means from a released to a cocked condition with each one-frame advance of said film, said shutter-cocking means restoring said shutter release means to a cocked condition responsively to movement of a movable cocking member coupled to said drive means to be driven from a released to a shutter-cocking position and including camming means coupled to said drive system to be rotatingly driven synchronously with film movement during film advance; and cam follower means coupled to said cocking member and urged to engagingly follow said camming means so as to move said cocking lever from said released to said shutter-cocking position during movement of said camming means, the improvement comprising:

decoupling clutch means for decoupling said camming means from said drive means during rewind and disposed so that said camming means is coupled through said clutch means to said sprocket means to be rotatingly driven thereby during film advance.

* * * * *